United States Patent
Ganesan

(10) Patent No.: US 7,966,652 B2
(45) Date of Patent: Jun. 21, 2011

(54) MASHAUTH: USING MASHSSL FOR EFFICIENT DELEGATED AUTHENTICATION

(75) Inventor: Ravi Ganesan, Half Moon Bay, CA (US)

(73) Assignee: SAFEMASHUPS Inc., San Antonio, TX (US)

( * ) Notice: Subject to any disclaimer, the term of this patent is extended or adjusted under 35 U.S.C. 154(b) by 693 days.

(21) Appl. No.: 12/098,789

(22) Filed: Apr. 7, 2008

(65) Prior Publication Data

US 2011/0047372 A1  Feb. 24, 2011

(51) Int. Cl.
*H04L 9/32* (2006.01)
*H04L 9/00* (2006.01)
*G06F 7/04* (2006.01)

(52) U.S. Cl. .................. 726/4; 726/27; 726/28; 726/29; 726/30; 713/169; 713/170; 713/171; 713/172; 713/173

(58) Field of Classification Search ........................ 726/4
See application file for complete search history.

(56) References Cited

U.S. PATENT DOCUMENTS

| | | | |
|---|---|---|---|
| 5,315,658 A | 5/1994 | Micali | |
| 5,657,390 A | 8/1997 | Elgamal et al. | |
| 6,141,750 A | 10/2000 | Micali | |
| 6,212,635 B1 | 4/2001 | Reardon | |
| 6,367,009 B1 | 4/2002 | Davis et al. | |
| 7,020,688 B2 | 3/2006 | Sykes, Jr. | |
| 7,318,238 B2 | 1/2008 | Elvanoglu et al. | |
| 7,651,677 B1 * | 1/2010 | Strohmaier et al. | 423/706 |
| 2003/0140226 A1 | 7/2003 | Yamamoto et al. | |
| 2003/0182423 A1 | 9/2003 | Shafir et al. | |
| 2004/0103283 A1 | 5/2004 | Hornak | |
| 2005/0086197 A1 | 4/2005 | Boubez et al. | |
| 2006/0080352 A1 | 4/2006 | Boubez et al. | |
| 2007/0289006 A1 | 12/2007 | Ramachandran et al. | |
| 2008/0046984 A1 | 2/2008 | Bohmer et al. | |

OTHER PUBLICATIONS

Mark Atwood "OAuth Core 1.0 Specification"—Dec. 4, 2007.*
SSL-over-SOAP: Towards a Token-based Key Establishment Framework for Web Services, Sebastian Gajek, Lijun Liao, Bodo Möller and Jörg Schwenk, IEEE ECOWS Workshop on Emerging Web Services Technology (WEWST'07), Halle (Germany), 2007.
BBauth. Yahoo! Browser Based Authentication. http://developer.yahoo.com/auth/.
OAuth: An open protocol to allow secure API authentication in a simple and standard method from desktop and web applications. http://oauth.net/.

* cited by examiner

*Primary Examiner* — Longbit Chai
(74) *Attorney, Agent, or Firm* — Sughrue Mion, PLLC; David P. Emery

(57) ABSTRACT

The present invention provides a method that allows the MashSSL protocol to be used to provide a secure and efficient way for delegated authentication. The invention allows services which already have an SSL infrastructure to reuse that infrastructure for delegated authentication, and to do so in a fashion where the cryptographic overhead is amortized across multiple users, and which provides the user with greater control of what information is shared on their behalf.

16 Claims, 14 Drawing Sheets

SSL

- Set-Up: Two web servers with regular SSL certificates.

- Handshake:

- At end of handshake both servers are mutually authenticated.
- All further communication after handshake is encrypted with secret.

FIGURE 5

```
<mashssl-handshake-1 version = "1.0">

<ssl-handshake-1-client-hello>
                <ssl-session-id>
                <random>
                        <gmt-unix-time>
                        <ssl-client-hello-random> //May be scrambled
                </random>
                <ciphersuites>
                </ciphersuites>
                <compression-list>
                </compression-list>
        </ssl-handshake-1-client-hello>

<mashssl-additions-1>
                <mashssl-principals>
                        <mashssl-user-id> //unique to this user
                        <mashssl-client-name> CUSTOMER
                        <mashssl-server-name> SERVICE-PROVIDER
                </mashssl-principals>
                <mashauth-paramters>
                        CUSTOMER COMMUNICATES INFORMATION FOR DELEGATED
AUTHENTICATION.
                </mashauth-parameters>
                <mashssl-user-client-random> //also scrambled; used to derive mashssl-user-
client-key//
                <client-certificate> //May be different from the SSL certificate
                <scramble-options>
                        <scrambling-on> //TRUE or FALSE
                        <high-entropy-scrambling-key> //TRUE or FALSE
                        <authentication-information> //PASSWORD, OTP, OOB, PKI, SC
                        <using-cached-key-at-user> //TRUE or FALSE
                </scramble-options>
                <scramble-options-requested-of-other-server>
                        <request-scrambling-on> //MUST-HAVE, PREFERRED, DONT-CARE
                        <request-high-entropy-user-key>//MUST-HAVE, PREFERRED, DONT-
CARE
                        <request-authentication-information>//ordered list
                        <request-using-cached-key-at-user>//MUST-HAVE,   PREFERRED,
DONT-CARE
                </scramble-options-requested-of-other-server>
        </mashssl-additions-1>

</mashssl-handshake-1>
```

FIGURE 6

```
MashSSL-Message-2
<?xml version="1.0" encoding="UTF-8"?>
<mashssl-handshake-2 version = "1.0">

<ssl-handshake-2-server-hello>
                <ssl-session-id> //Fresh session-id, unless reusing existing parameters //
                <random>
                        <gmt-unix-time>
                        <ssl-serverhello-random>   //Tag,   or   tag/value   scrambled,   if
scrambling is on //
                </random>
                <ciphersuite>
                <compression-choice>
                <server-certificate>
                <certificate-request>
        </ssl-handshake-2-server-hello>

<mashssl-additions-2>
                <mashssl-principals>
                        <mashssl-user-id>
                        <mashssl-client-name>
                        <mashssl-server-name>
                </mashssl-principals>
                <mashauth-paramters>
                        CUSTOMER      COMMUNICATES      INFORMATION      FOR
DELEGATED AUTHENTICATION.
                </mashauth-parameters>
                <server-certificate>
                <mashssl-low-entropy-scrambling-verify>   //e.g.   Validation   of   correct
password entry//
                <mashssl-user-server-random> //used to derive mashssl-user-server-key//
                <scramble-options>
                        <scrambling-on> //TRUE or FALSE //
                        <high-entropy-scrambling-key> //TRUE or FALSE//
                        <authentication-information> //PASSWORD, OTP, OOB, PKI, SC //
                        <using-cached-key-at-user> //TRUE or FALSE //
                </scramble-options>
        </mashssl-additions-1>

</mash-ssl-handshake-2>
```

FIGURE 7

MashSSL-Handshake-3XML
<?xml version="1.0" encoding="UTF-8"?>
<mashssl-handshake-3 version = "1.0">

<ssl-handshake-3-client-key-exchange>
        <ssl-session-id>
        <client-certificate>
        <client-key-exchange>  //pre-master-secret encrypted with server public key//
        <certificate-verify> //rhash signed with client private key //
        <Finished>
    </ssl-handshake-3-client-key-exchange>

<mashssl-additions-3>
        <mashssl-principals>
            <mashssl-user-id>
            <mashssl-client-name>
            <mashssl-server-name>
        </mashssl-principals>
        <mashssl-data-for-user> //data encrypted with mashssl-user-client-key//
        <mashssl-data-for server> //data encrypted with master-secret//

</mashssl-additions-3>

</ mashssl-handshake-3>

FIGURE 8

MashSSL-Handshake-XML4
<?xml version="1.0" encoding="UTF-8"?>
<mashssl-handshake-4 version = "1.0">

<ssl-handshake-4-server-finished>
        <ssl-session-id>
        <Finished>
    </ssl-handshake-4-server-finished>

<mashssl-additions-4>
        <mashssl-principals>
            <mashssl-user-id>
            <mashssl-client-name>
            <mashssl-server-name>
        </mashssl-principals>
        <mashauth-ticket-for-this-user> //encrypted with master-secret
        <mashssl-data-for-user> //data encrypted with mashssl-user-server-key//
        <mashssl-data-for client> //data encrypted with master-secret//
    </mashssl-additions-4>

</ mashssl-handshake-4>

FIGURE 9

MashSSL-Application-Data-XML
<?xml version="1.0" encoding="UTF-8"?>
<mashssl-application-data version = "1.0">
    <ssl-session-id>
    <mashssl-direction-origin> //CLIENT or SERVER//
    <mashssl-principals>
        <mashssl-user-id>
        <mashssl-client-name>
        <mashssl-server-name>
    </mashssl-principals>
    <mashauth-data-request>
        Request for data. //If the message is from Customer to Service-Provider
        Data response. //If the message is from Service-Provider to Customer
    </mashauth-data-request>
    <mashssl-data-for-user> //data encrypted with mashssl-user-client or server-key//
    <mashssl-data-for-other-server> //data encrypted with master-secret//
<mashssl-application-data>

FIGURE 10

MashSSL-Handshake-XML2abbreviated
<?xml version="1.0" encoding="UTF-8"?>
<mashssl-handshake-2abbreviated version = "1.0">

<ssl-handshake-2-server-hello>
        <ssl-session-id> //Same session-id as in ssl-handshake-1-client-hello //
        <random>
            <gmt-unix-time>
            <ssl-serverhello-random>
        </random>
        <Finished>
    </ssl-handshake-2-server-hello>

<mashssl-additions-2>
        <mashssl-principals>
            <mashssl-user-id>
            <mashssl-client-name>
            <mashssl-server-name>
        </mashssl-principals>
        <mashauth-paramters>
            CUSTOMER COMMUNICATES INFORMATION FOR DELEGATED AUTHENTICATION.
        </mashauth-parameters>
        <mashauth-ticket-for-this-user> //encrypted with master-secret
        <server-certificate>
        <mashssl-user-server-random> //used to derive mashssl-user-server-key//
        <mashssl-low-entropy-scrambling-verify> //e.g. Validation of correct password
        <scramble-options>
            <scrambling-on> //TRUE or FALSE //
            <high-entropy-scrambling-key> //TRUE or FALSE//
            <authentication-information> //PASSWORD, OTP, OOB, PKI, SC //
            <using-cached-key-at-user> //TRUE or FALSE //
        </scramble-options>
        <mashssl-data-for-user> //data encrypted with mashssl-user-server-key//
        <mashssl-data-for-client> //data encrypted with master-secret//
    </mashssl-additions-1>

</mash-ssl-handshake-2abbreviated>

FIGURE 11

MashSSL-Handshake-XML3abbreviated
<?xml version="1.0" encoding="UTF-8"?>
<mashssl-handshake-3abbreviated version = "1.0">

<ssl-handshake-3-client-key-exchange>
        <ssl-session-id>
        <Finished>
    </ssl-handshake-3-client-key-exchange>

<mashssl-additions-3>
        <mashssl-principals>
            <mashssl-user-id>
            <mashssl-client-name>
            <mashssl-server-name>
        </mashssl-principals>
        <mashssl-data-for-user> //data encrypted with mashssl-user-client-key//
        <mashssl-data-for server> //data encrypted with master-secret//
    </mashssl-additions-3>

</ mashssl-handshake-3abbreviated>

FIGURE 12

MashSSL-Direct-Handshake-XML1
<?xml version="1.0" encoding="UTF-8"?>
<mashssl-direct-1 version = "1.0">

<ssl-handshake-1-client-hello>
        <ssl-session-id>
        <random>
            <gmt-unix-time>
            <ssl-client-hello-random> //May be scrambled
        </random>
        <ciphersuites>
        </ciphersuites>
        <compression-list>
        </compression-list>
    </ssl-handshake-1-client-hello>

<mashssl-additions-1>
        <mashssl-principals>
            <mashssl-user-id> //unique to this user
            <mashssl-client-name> CUSTOMER
            <mashssl-server-name> SERVICE-PROVIDER
        </mashssl-principals>
        <mashauth-paramters>
            CUSTOMER COMMUNICATES INFORMATION FOR DELEGATED AUTHENTICATION.
        </mashauth-parameters>
        <mashauth-ticket-for-this-user> //encrypted with master-secret </mashssl-additions-1>

</mashssl-Direct-1>

FIGURE 13

MashSSL-Handshake-Direct-XML2
<?xml version="1.0" encoding="UTF-8"?>
<mashssl-direct-2 version = "1.0">

<ssl-handshake-2-server-hello>
        <ssl-session-id> //Same session-id as in ssl-handshake-1-client-hello //
        <random>
            <gmt-unix-time>
            <ssl-serverhello-random>
        </random>
        <Finished>
    </ssl-handshake-2-server-hello>

<mashssl-additions-2>
        <mashssl-principals>
            <mashssl-user-id>
            <mashssl-client-name>
            <mashssl-server-name>
        </mashssl-principals>
        <mashauth-paramters>
            CUSTOMER COMMUNICATES INFORMATION FOR DELEGATED AUTHENTICATION.
        </mashauth-parameters>
        <mashauth-ticket-for-this-user> //encrypted with master-secret
    </mashssl-additions-1>

</mashssl-direct-3abbreviated>

FIGURE 14

MashSSL-Handshake-Direct-XML3
<?xml version="1.0" encoding="UTF-8"?>
<mashssl-direct-3 version = "1.0">

<ssl-handshake-3-client-key-exchange>
        <ssl-session-id>
        <Finished>
    </ssl-handshake-3-client-key-exchange>

<mashssl-additions-3>
        <mashssl-principals>
            <mashssl-user-id>
            <mashssl-client-name>
            <mashssl-server-name>
        </mashssl-principals>
        <mashssl-data-for-user> //data encrypted with mashssl-user-client-key//
        <mashssl-data-for server> //data encrypted with master-secret//
    </mashssl-additions-3>

</ mashssl-direct-3>

MASHAUTH: USING MASHSSL FOR EFFICIENT DELEGATED AUTHENTICATION

TECHNICAL FIELD

This invention relates to cryptography. More particularly it relates to delegated authentication.

BACKGROUND ART

Authentication and Man in the Middle Phishing

Many authentication techniques exist which allow an entity (e.g. a user or a web server) to prove its identity to another entity. Often these systems are based on the existence of a shared secret. For instance, revealing knowledge of a shared password is a very common method. Or, one can have 'one time passwords' which are generated based on a shared secret, with both parties having the ability to compute the one time password.

Some systems do not rely on shared secrets, and instead use a technique called public-key cryptography. Here the user proves knowledge of a secret, for instance, by using it to sign a message, but does not reveal the secret itself. The signature is typically verified using information that is unique to the user, but is public. Public key cryptography is typically implemented using a technology called digital certificates. In general, systems based on public key cryptography are considered more secure, but are not as widely used because they are cumbersome (especially for human users; as opposed to computer servers).

Almost all these techniques are vulnerable to the insertion of an attacker in between the legitimate parties. Such an attack is known as a man in the middle (MITM) attack. This has led to the widespread incidence of so-called phishing attacks. Two types of phishing attacks exist, off line and real time. In the off-line case, the MITM simply fools the user into giving up their secret, and at a later time, can enter the password into the legitimate web site. In the on-line case, the man in the middle attacker ferries traffic back and forth in real time. In this case even if the secret is short lived, e.g. a hardware token with a secret number that changes every thirty seconds, the session can be phished. Both such attacks have been widely observed in practice.

It is important to note that the use of stronger techniques like public key cryptography by themselves do not guarantee protection against a man in the middle. Consider a simple example. Assume the web server requires the user to use public key cryptography to sign a fresh challenge in order to authenticate. In this case a real time MITM could simply get the challenge from the web server, transmit that challenge to the user, who will sign it and return it to the MITM, who returns it the legitimate web server. The web server is satisfied and will let the MITM access the system! While this simple use of public key cryptography is easily seen to be insecure, more secure protocols exist which prevent MITMs. For instance the Secure Sockets Layer (SSL) protocol when used with mutual authentication (defined later), can thwart a MITM attacker. While SSL is very widely used, it is rarely used with mutual authentication.

The Secure Sockets Layer Protocol

The SSL protocol (which has been renamed the Transport Layer Security or TLS protocol) is one of the most widely used security protocols on the Internet. As is evident from the name it has been designed to be a two entity protocol most generally used to secure "sockets" (or more generally the "transport layer" in a communication protocol). For instance, on the Internet, which uses TCP/IP, SSL is used to take a "TCP socket" between two entities and make it a "secure socket". Once such a "secure socket" has been established, application level protocols like HTTP can be run between the two entities over the secure socket (HTTP over SSL is at times referred to as HTTPS for brevity).

Note that while SSL is described as an end to end protocol, the actual packets carrying the SSL traffic might go through many intermediate hops. e.g. in the classic case where TCP/IP is used as the transport the IP packets might traverse many different nodes. However, the intermediate nodes play no part in processing the SSL messages, and for them it is simply data being transported. Similarly, others have proposed or implemented SSL as a two entity protocol used over wireless, used over datagram services, used over the SOAP standard, etc. All these variations of SSL do not change the fundamental two entity end to end authentication and key exchange purpose of SSL, and the presence of intermediate points play no role in the processing of SSL. This work has no bearing on our invention, which will introduce an active man in the middle necessary for correct protocol functioning.

There have also been numerous implementations of what are sometimes referred to as 'SSL proxies'. Here there is a proxy or gateway between the end points. However, there is no longer one SSL connection between the end points. Rather, there is a SSL connection from one end point to the gateway, and then another SSL connection between the gateway and the other end point. This also has no bearing on our work, which is focussed on a single SSL session with end to end security.

SSL can be used to perform three functions to secure a connection between Entity 1 and Entity 2:

1. Entity 1 (often a user at a browser) can authenticate Entity 2 (often a web service), if Entity 2 has a trusted digital certificate.
2. Provide for encrypted communication between Entity 1 and Entity 2.
3. Can optionally be used to authenticate Entity 1 to Entity 2 (mutual authentication), if Entity 1 has a trusted digital certificate.

In general when Entity 1 is a user at a browser, and Entity 2 is a web server, then only the first two steps are used. As an example, any user can visit the USPTO at https://sas.uspto.gov/ptosas/ and set up a HTTP over SSL connection. However, at that point, while the user has authenticated the USPTO web site (and has an encrypted session), the USPTO has not authenticated the user. For this to happen the user would need a digital certificate.

In practice it is easy for organizations/servers to possess digital certificates. For instance in the example above, the USPTO could have purchased the digital certificate it uses to secure its web site for literally less than ten dollars and have set it up in a few minutes. On the other hand, it has proven very difficult for individual users to obtain, carry and use certificates. As an example, the USPTO has a program to issuer customers with certificates. (see https://sas.uspto.gov/enroll/traditional-client-zf-create.html), and it can be easily seen that giving users certificates and managing them on an ongoing fashion is difficult and costly.

For these reasons, SSL is typically used to authenticate a web site (e.g. USPTO) to a user's browser, but not typically the other way around. The exception to this would be when SSL is used to secure server to server communication. As it is simple for both servers to be set up with digital certificates, in such cases SSL is often used with mutual authentication.

SSL works in two steps, first Entity 1 and Entity 2 perform a 'handshake' in the course of which the authentication and the key exchange for encryption are performed, and a variety of other parameters are exchanged. Once the 'handshake' is complete the two parties can communicate securely using a shared master_secret. As it is relevant to our future discussion, we will describe the SSL handshake (with mutual authentication). Our description is meant to convey the essence of the protocol, and is not meant to be a detailed description for which we refer the reader to the Internet standard.

FIG. 1 shows the standard SSL handshake. To begin with, it is assumed that both entities (referred to as Server 1 and Server 2 for convenience) have digital certificates issued by authorities the other party trusts. The protocol begins with a handshake mechanism which consists of four message exchanges:

SL-Handshake-1 (aka CLIENT-HELLO) Server 1 sends a message to Server 2 which among other things contains a random number, which we call R1. [R1]

SSL-Handshake-2 (aka SERVER-HELLO) Server 2 replies with another random number R2, its own digital certificate, and a request for mutual authentication (somewhat misleadingly called the Certificate-Request). [R2, Cert2, Request Cert1]

SSL-Handshake-3 (aka CLIENT-KEY-EXCHANGE) Server 1 verifies the authenticity of Server 2's certificate, and in the process extracts Server 2's public key. It then encrypts a third random number which we call R3 with this public key. It further signs a running_hash of all messages exchanged up to that point with its own private key. Server 1 then sends the encrypted R3, the signed running hash, and its own certificate to Server 2. [encrypt(R3,Cert2),Sign(running_hash,Cert1), Cert1]. Server 1 also combines R1, R2 and R3 to create a master_secret.

SSL-Handshake-4 (SERVER-FINISHED) On receiving the above message, Server 2 uses its own private key to recover R3 from the encrypted packet. It then verifies the authenticity of Cert1 and extracts Server1's public key, which it then uses to verify the signature on the running_hash. If the signature was valid, then at this point Server 2 has authenticated Server 1. It then combines R1, R2 and R3 to create the master_secret. Finally, it sends a message to Server 1 encrypted with the master_secret. encrypt(Done, master_secret). On receiving this message Server 1 will attempt to decrypt it using the master_secret it independently computed in Step 3. If the decryption is correct then Server 1 has authenticated Server2.

Both parties have now authenticated each other and share a secret the master_secret, which they can use for further communication with each other.

What we have described is the handshake with mutual authentication which assumes both parties have certificates. Often one side, typically a user at a browser, will not have a certificate, but the other side, e.g. the USPTO web site, will have a certificate. In this case the web site will not request mutual authentication, and the browser will not sign the running_hash. Otherwise the rest of the protocol remains the same. While this has some value, the MITM protection only comes into play when mutual authentication is used. This is why phishing has been widespread in spite of SSL being deployed widely.

In the event that two entities have previously exchanged a master_secret, which they have retained, the protocol provides a way for them to resume communications over a new transport, using the existing parameters. In this "abbreviated handshake":

The first handshake message from the first entity to the second entity contains the SessionID of the previous session.

If the second entity is willing and able to resume the previous session, the reply contains the same SessionID, and a message encrypted with the previous master_secret.

If the first entity successfully decrypts the message then it in effect authenticates the second entity. It then responds with its own message encrypted with the master_secret. The second entity can decrypt this message thus authenticating the first entity.

This allows the two entities to resume the session without having to perform any operations involving public key cryptography (which is resource intensive).

MashSSL

MashSSL is a three entity mutual authentication and key exchange protocol based on the SSL protocol. It is fully described in the related application, "MASHSSL: A NOVEL MULTI PARTY AUTHENTICATION AND KEY EXCHANGE MECHANISM BASED ON SSL", and FIG. 2 shows an example comparison.

Delegated Authentication

It is often the case that a web service A may desire to provide a user with a service which requires data from a third party B. Several approaches abound to solve this problem:

The user can go to A, get the data, and then give it to B. This is obviously quite cumbersome.

The user can give away its credentials to access the data at B, to web service A. A then pretends to be the user and obtains the data. This obviously has the security weakness of the user having to give away their credential with B to A. It becomes a further problem as on-line credentials become stronger, and are inherently hard to 'give away'. e.g. if the credential is based on a smartcard or a biometric it literally cannot be given away.

The user can delegate a certain amount of authority to A to get data or take actions on its behalf at B. This is conceptually identical to how a 'power of attorney' works in the physical world. Our focus is on this type of delegated authentication in the on-line context.

There have been several schemes proposed along the lines of the third approach, with numerous variants. For instance, several schemes are based on the notion of Service A getting a 'claim' or 'ticket' with the cooperation of the user, which is then presented to Service B. Before describing our invention we will briefly describe three schemes currently in widespread use on the web. These three schemes can be thought of as representative of the large number of schemes of this nature.

Google Delegated Authentication for Web Applications

In the Google system there are four entities:

The User who wants to delegate privileges to a web application

The Web Application that wants to access a Google Service on behalf of the user

The Google Authentication system with which the User shares a credential

The Google Service which has the User's data

This is shown in FIG. 3 (which is reproduced from the Google web site describing the protocol) and describes the protocol flow.

The process proceeds as follows:

The User goes to the Web Application, which,

Redirects user's browser to Google authentication with a request for a token.

The User is asked to log in and grant permission.

If permission is granted the browser is redirected back to the web application with the token.

The application can now present the token to the Google Service,

Which responds with the data.

Google has two further concepts germane to this discussion:

Tokens may be 'secure' or not. Secure tokens are only granted to 'registered' applications.

The Web Application may be 'registered' (that is, it has been vetted before).

In Step 2 when the user gives permission to the Web Application, Google informs the User if the application is secure or not, and informs them whether it has been registered. Naturally, it is likely that the User will be far more inclined to grant permission to a 'secure and registered' application, versus, one which triggers a warning saying it is not secure and not registered. Further, each Google service can choose to only accept 'secure' and 'registered' Web Applications. Our focus consequently is on the 'registered' and 'secure token' process.

Any application provider can go through a process by which they get 'vetted' (prove control of their domain) by Google and become a registered web application. When they do this can 'register with enhanced security' for which they register a digital certificate with Google (the Web Application retains the private key). Any request for a secure token made by the Web Application henceforth must be digitally signed using the private key associated with that service.

Observations on Inefficiencies:

Multiple Authentications: Note that requests for tokens made by the web application are on a per user per service basis. This means that if a web application is serving a large number of users, then it needs to perform a digital signature for each request for each user, and Google will have to do the signature verification each time. As both operations require the use of public key cryptography (Google specifies the RSA algorithm at this time) these are expensive operations. It is instructive to note that Google has to do this because the access it is allowing is authorized by individual users. In other words, the web application is not authorized to access data on any user's behalf, each token ties a given user to the web application.

Multiple Security Protocols: While not obvious from the figure, Steps 1 through 4 are happening through the user's browser. Steps 5 and 6 are a direct web connection between the web application and Google. This latter connection, as it is requesting sensitive user data, is actually running over SSL. In other words, in addition to the digital signature overhead in the application protocol, there is additional SSL overhead (which again involves a number of public key operations).

Multiple Credentials: The Web Application need certificates for use with SSL, and additional certificates for use for registering and requesting secure tokens.

Credentialing Overhead: Google has to set up a registration process to verify the authenticity of web applications and the companies that host them. Notice however that for its SSL connection Google relies instead on a 3rd Party credentialing service (the certificate authority)

Lack of strong user control. While information is only shared by Google after the user gives permission, the permission choices have to be made in advance of data sharing and the user does not see the actual data being shared. While this may be tolerable in some cases, it is likely that in many cases, having the user explicitly view the data being transferred and explicitly authorizing the transfer is preferable.

Yahoo! Delegated Authentication (BBauth)

In the Yahoo! system the process flows as follows:

The Web Application does a one time registration with Yahoo! at which point it gets certain parameters, including a shared secret it will use to authenticate in future to Yahoo!.

The first time the Web Application needs to access Yahoo! on behalf of the User the User is redirected to Yahoo! as shown in the figure below, and a token is sent back by Yahoo! to the Web Application. The redirect includes a 'signature' created by the Web Application. It should be noted that this 'signature' is actually a hash that includes various values including the shared secret, and does not use digital certificates.

This token (which is valid for 14 days) is used by the Web Application to get temporary 'user credentials' which are valid for one hour.

The 'temporary user credentials' are in turn used to access the actual data on behalf of the user.

Observations on Inefficiencies

Multiple Authentications: The Web Application has to get tokens on a per user basis. Again, this is deemed necessary because the Web Application is not given carte blanche access, The inefficiency is in that the authentication of the Web Application itself is repeated each time for each user.

Multiple Security Protocols: When the request for data is actually made, it is done so over SSL. In other words all the cryptographic overhead of SSL is invoked in addition to the cryptography to authenticate and verify the tokens.

Multiple Credentials. The Web Application needs SSL credentials and distinct credentials from Yahoo!

Credentialing Overhead. Yahoo! has to set up a registration process to verify the authenticity of web applications and the companies that host them.

Lack of strong user control. While information is only shared by Yahoo! after the user gives permission, the permission choices have to be made in advance of data sharing and the user does not see the actual data being shared. While this may be tolerable in some cases, it is likely that in many cases, having the user explicitly view the data being transferred and explicitly authorizing the transfer is preferable.

Oauth: Delegated Authentication

Oauth (http://oauth.net) is a proposed standard for achieving more or less the same goals as the Google or Yahoo! protocols described earlier. It is derived from the above schemes and other schemes similar to them. In Oauth the entities are defined as:

User

Consumer (the web application which wants to GET data on behalf of the user)

Service Provider (the web service that has the user's data).

The OAuth process works as follows:

The Consumer registers with the Service Provider and obtains credentials which could be a shared secret or a digital certificate.

For each request, the:

Consumer contacts the Service Provider directly and obtains a "unauthorized request token'.

When the User accesses the Consumer, the User's browser is redirected to the Service Provider with the "unauthorized request token".

The user authenticates to the Service Provider, who then creates an 'authorized request token', which is sent back to the Consumer via the User's browser.

The Consumer exchanges the 'authorized request token' for an 'access token', which is used to retrieve the data.

The inefficiencies are very similar to those of the Google and Yahoo! systems.

Summary of Inefficiencies of Most Delegated Authentication Protocols

Multiple Authentications. The authentication cryptographic overhead is incurred for each user. Though the Service Provider and the Consumer might be communicating on behalf of hundreds of thousands of users, the cost of cryptographic processing is incurred for each user.

Multiple Security Protocols. The application level security protocols typically involve cryptographic overhead in addition to the cryptographic overhead used for the transport level SSL connections to retrieve data Multiple Credentials. The Consumer needs one set of credentials for the application security protocol (OAuth) and another set for the SSL connection.

Credentialing Overhead. The Service Provider (from whom data is accessed) has to credential all Consumers (the service accessing the data). Similarly Consumers may need credentials with multiple Service Providers. This is in addition to SSL credentials all parties have.

Lack of strong user control. While information is only shared by Yahoo! after the user gives permission, the permission choices have to be made in advance of data sharing and the user does not see the actual data being shared. While this may be tolerable in some cases, it is likely that in many cases, having the user explicitly view the data being transferred and explicitly authorizing the transfer is preferable.

OBJECTIVES OF THE INVENTION

This invention, MashAUTH, has the following objectives:
1. Use MashSSL to create an efficient protocol for delegated authentication.
2. Use the MashAUTH protocol to provide
    a secure method by which a Consumer who authenticates to a Service Provider to access data on behalf of a first User, can reuse this authentication when operating on behalf of other Users.
    a mechanism to avoid the duplication of cryptographic processing of an application level protocol and SSL at the transport level.
    a mechanism where Consumers can reuse their SSL credentials for authenticating as a Consumer.
    a credentialing mechanism that lends itself to the concept of Consumers using a single credential across several Service Providers.
    a mechanism allow for the user to view, and explicitly authorize, the transfer of information from one party to the other.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

As in the OAuth standard we will use the terms:
User for the user at the PC (aka the delegator)
Consumer for the web service to which the User will delegate authority (aka the delegatee)
Service Provider for the web service from which the Consumer will retrieve information belonging to the User. (aka the third entity)

Our first innovation is a delegated authentication protocol in which the authorization portion of the communication between the Consumer and the Service Provider is conducted via the user's browser and begins by conducting a MashSSL handshake.

Our second innovation is to allow the Consumer and Service Provider to use their SSL credentials to mutually authenticate each other, obviating the need to pre-establish credentials unique for this purpose. This innovation allows Certificate Authorities to credential Consumers and Service Providers once, and have this 'credentialing cost' to be amortized across many different Consumer-Service Provider connections. For instance, a Consumer might get one credential from a Certificate Authority to authenticate itself to several different Service Providers.

Our third innovation is to allow the Consumer and Service Provider to in the course of the handshake, or just after the handshake, agree on:
1. A 'ticket' which contains Parameters to be used for this connection with this User.
2. Parameters to use for future connections (which will be established via different users), which would allow them to avoid re-authenticating. Specifically, they can agree to use as their session id the MashSSL SessionID. Use as their session key the MashSSL master_secret that is exchanged as part of MashSSL. And, agree on other parameters such as the lifetime for which the session can be reused.

Our fourth innovation is to allow the Customer and the Service Provider to establish a MashSSL connection for a new user, using the SessionID and master-secret they had previously agreed on in the context of the original user, greatly improving cryptographic processing efficiency.

Our fifth innovation is to leverage the fact that the MashSSL session happens through the user's browser to allow the user to view and authorize the data that is being passed from the Service Provider to the Customer, at a very specific level. Instead of giving the Customer generic rights to access a chunk of information, this allows the user to selectively allow/disallow the passing of certain pieces of data.

Our sixth innovation conversely allows the user to sanction the Customer to access the Service Provider directly (without going through the browser) using the User specific keys agreed to during the MashSSL handshake.

BRIEF DESCRIPTION OF DRAWINGS

FIG. 5 depicts the first MashAUTH XML handshake message sent in the preferred embodiment, in accordance with the present invention.

FIG. 6 depicts the second MashAUTH XML handshake message sent in the preferred embodiment, in accordance with the present invention.

FIG. 7 depicts the third MashAUTH XML handshake message sent in the preferred embodiment, in accordance with the present invention.

FIG. 8 depicts the fourth MashAUTH XML handshake message sent in the preferred embodiment, in accordance with the present invention.

FIG. 9 depicts the third MashAUTH XML application data message sent in the preferred embodiment, in accordance with the present invention.

FIG. 10 depicts the abbreviated XML message sent in place of the second handshake message when reuse of parameters has been requested in the preferred embodiment, in accordance with the present invention.

FIG. 11 depicts the abbreviated XML message sent in place of the third handshake message when reuse of parameters has been requested in the preferred embodiment, in accordance with the present invention.

FIG. 12 depicts the first MashAUTH "direct" handshake XML message sent in the preferred embodiment, in accordance with the present invention.

FIG. 13 depicts the second MashAUTH "direct" handshake XML message sent in the preferred embodiment, in accordance with the present invention.

FIG. 14 depicts the third MashAUTH "direct" handshake XML message sent in the preferred embodiment, in accordance with the present invention.

PREFERRED EMBODIMENT(S) OF THE INVENTION

Figure 1:
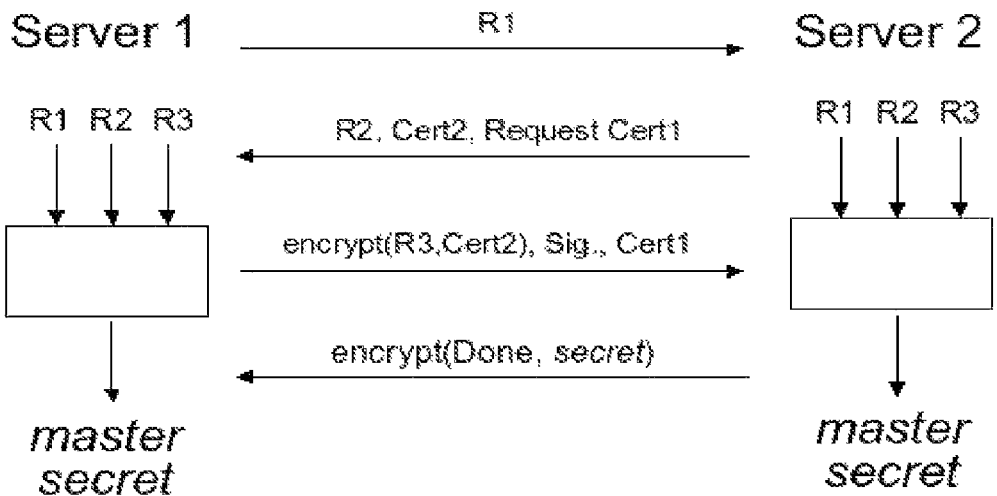
FIG. 1 depicts two servers conducting a standard SSL handshake.
Figure 2:
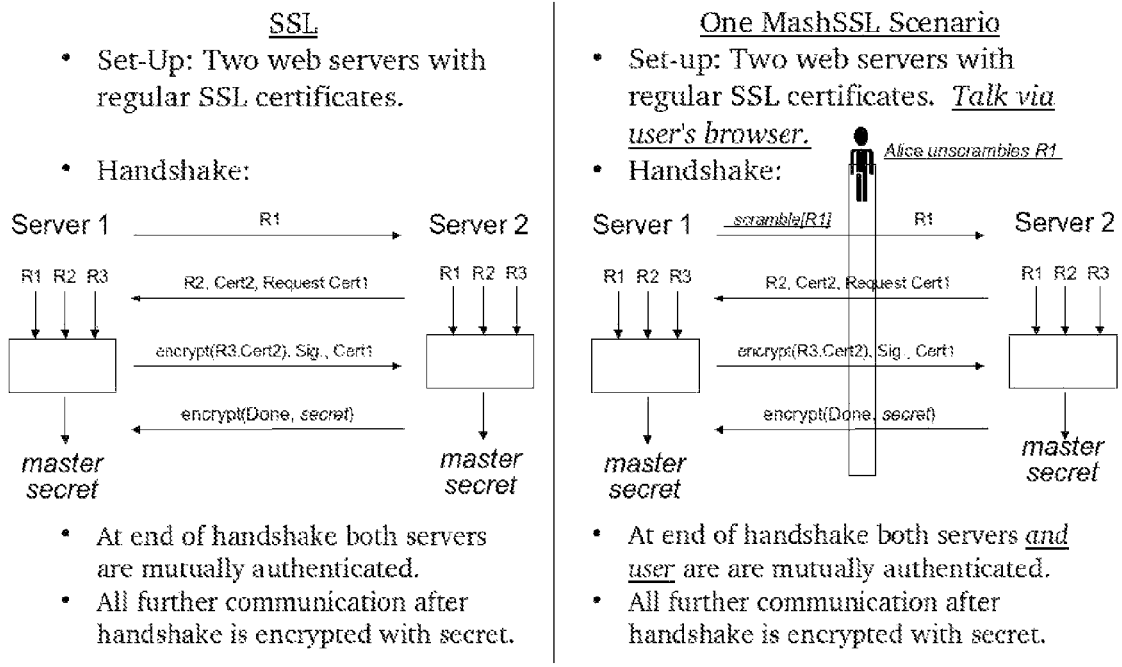
FIG. 2 depicts the comparison between servers conducting a SSL handshake versus servers conducting an example MashSSL handshake through a User.
Figure 3:
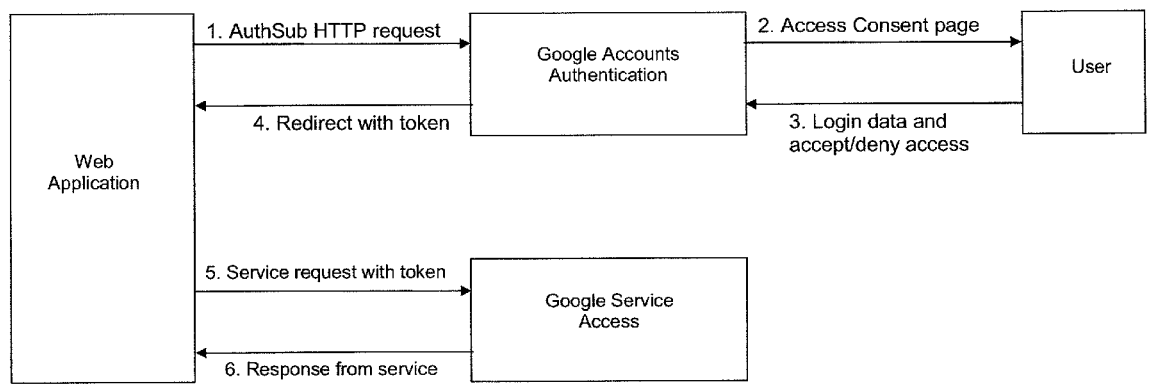
FIG. 3 is an example of a delegated authentication (reproduced from http://code.google.com/apis/accounts/docs/AuthForWebApps.html)
Figure 4:
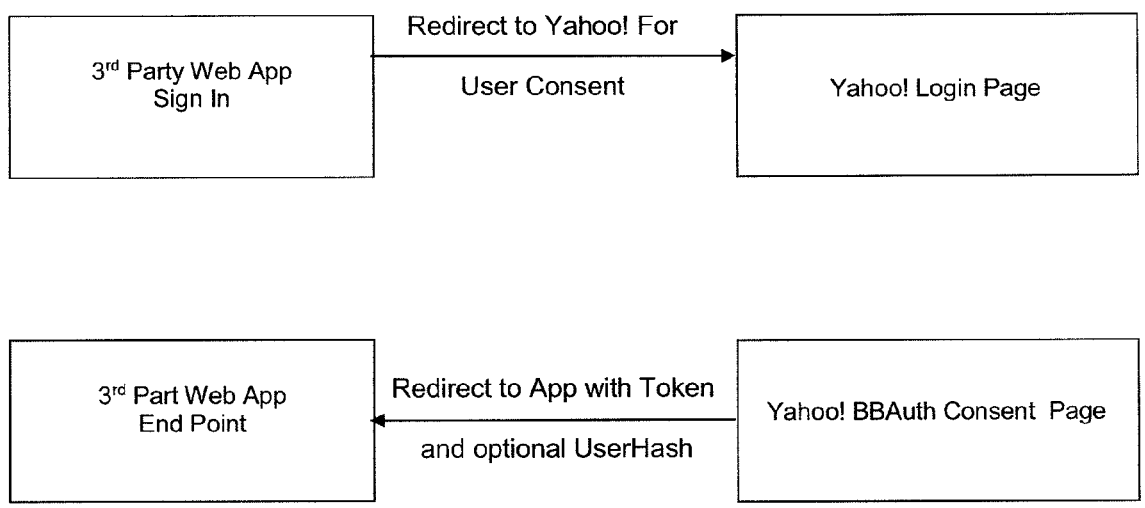
FIG. 4 is another example of a delegated authentication protocol (reproduced from http://developer.yahoo.com/auth/)

The set up for our preferred embodiment is as follows:
The User is at a browser with connections open to two web services
The first web service, the Customer, wants to access the user's data at the second web service, the Service Provider. The Customer is equivalent to the Client in the MashSSL protocol, and the Service Provider equivalent to the Server.
The Customer and the Service Provider have regular SSL credentials issued by Certificate Authorities they mutually trust.
The User may have credentials with one or both of the Customer and Service Provider.

We will highlight the parts of the MashAUTH protocol that are unique and significantly different from the underlying MashSSL protocol.

Assuming the Customer has not previously contacted the Service-Provider The Customer sends the MashSSL-Handshake-XML1 message to the User as shown in FIG. 5.

The message consists of the traditional SSL parameters, and MashSSL specific information. The latter explicitly has information on whether the Client has scrambled the message, and if so how they have done it. It also has options requested of the Service Provider in how the Customer would like the Service-Provider to handle the scrambling between the Service-Provider and the User. If the Customer has chosen to scramble there are two main variants:
The scrambling is with a high-entropy key which is not vulnerable to dictionary attacks. In this case the 'tag' <ssl-client-hellp-random> and the actual random number that follows it, are both scrambled. This way a legitimate user will know when the unscrambling is successful as it will see the tag.
If however the scrambling is with a low entropy key (e.g. a weak password), then only the random part is scrambled, so that the attacker who is guessing passwords will not know when they have succeeded. In this case the random number, after unscrambling, will come back to the Customer (encrypted with its public key) so that it can verify that unscrambling happened correctly.

Upon receiving this message the User will, if scrambling is turned on, unscramble the message using their credential with the Customer. The user also unscrambles the mashssl-user-client-random random number, which the Customer and the User can use to communicate securely. Observe that the Service-Provider need not be given this key.

The User is afforded the opportunity to view the <mash-auth-parameters> and can decide whether to allow the request to proceed to the Service-Provider. A key option here is whether the User wants to allow the Customer to talk directly with the Service Provider, or whether the User would like to be in the middle of all information transfer. If so, the message is forwarded to the Service-Provider.

The Service-Provider will examine the message, and if the various parameters are acceptable and it is in a position to participate in the connection, will reply to the User with the MashSSL-Handshake-2 as shown in FIG. 6.

The message consists of the traditional SSL parameters, and MashSSL specific information. The latter explicitly has information on whether the Customer has scrambled the message, and if so how they have done it. It also has options requested of the Service-Provider in how the Customer would like the Service-Provider to handle the scrambling between the Service-Provider and the Customer. If the Service-Provider has chosen to scramble there are two main variants:
The scrambling is with a high-entropy key which is not vulnerable to dictionary attacks. In this case the 'tag' <ssl-client-hellp-random> and the actual random number that follows it, are both scrambled. This way a legitimate user will know when the unscrambling is successful as it will see the tag.
If however the scrambling is with a low entropy key (e.g. a weak password), then only the random part is scrambled, so that the attacker who is guessing passwords will not know when they have succeeded. In this case the random number, after unscrambling, will come back to the Service-Provider (encrypted with its public key) so that it can verify that unscrambling happened correctly.

Upon receiving this message the User will, if scrambling is turned on, unscramble the message using their credential with the Service-Provider. The user also unscrambles the mashssl-user-client-random random number, which the Service-Provider and the User can use to communicate securely. Observe that the Customer need not be given this key.

The Service-Provider uses the scrambling process to require the User to explicitly authorize the connection with the Customer, including whether the Customer is allowed to access the Service Provider directly.

After unscrambling, the User will pass on the message to the Customer. At this point the Customer and the Service-Provider have successfully exchanged the first two random numbers. The Customer computes the appropriate SSL responses and then proceeds to send the User MashSSL-Handshake-3XML to the User as shown in FIG. 7.

The User strips this message of the <mashssl-data-for-user> tag and value which could contain data destined for the User. The rest of the message is passed on to the Service-Provider.

This message, which includes the Customer's signature, authenticates the Customer to the Service-Provider, and also sends the Service-Provider a pre-master-secret, from which the Customer and the Service-Provider can both derive the master-secret. Observe that the User has no way of computing this master-secret. The Service-Provider then replies to the User with the MashSSL-Handshake-XML4 as shown in FIG. 8.

The User strips this message of the <mashssl-data-for User> tag and associated value, and sends on to the Customer. The Customer on successfully verifying the Finished message in the SSL part of the handshake has authenticated the Server. At the conclusion of the protocol all three parties have either explicitly or implicitly authenticated each other. The only exception to this case would be if neither the Customer nor the Service-Provider requests scrambling, in which case the User remains unauthenticated. The User shares (different) keys with the Customer and the Service-Provider for communication, and the Customer and the Service-Provider share the master-secret. The <mashauth-ticket-for-this-user> is provided to the Customer to present to the Service-Provider on all future requests related to this user.

If communications are to be conducted via the User, then they are conducted using the MashSSL-Application-Data-XML message as shown in FIG. 9.

In this case, depending on the User's options, the data may be explicitly shown to the User en route and the User can select whether or not to allow the flow of data.

Now if a different user visits the same Customer web service and causes the Customer to decide to establish a MashSSL session with the same Service-Provider web service, the Customer and Service-Provider can take advantage of the fact that they already share parameters from the previous MashSSL session.

The first message from the Customer to the New User to the Ser Service-Provider ver is the same as the MashSSL-Handshake-XML1 message, except that the <ssl-session-id> value is the same as the value agreed on during the previous session. Further, the random value in the <ssl-client-hello-random> tag is DIFFERENT from any used before. And the scrambling aspects remain the same. The User will be prompted that the request is being sent.

If the Service-Provider is willing and able to reuse those parameters, than the Server responds via the user with an MashSSL-Handshake-XML2abbreviated message, as shown in FIG. 10. Again, the <ssl-serverhello-random> value is DIFFERENT, and the scrambling aspects remain the same.

The User is prompted by the Service-Provider to authorize the session.

The Customer validates (using the Finished message) that the Service-Provider is in possession of the correct master-secret, and replies with MashSSL-Handshake-XML3 abbreviated, as shown in FIG. 11.

The Server uses the Finished message to validate that the Client was indeed in possession of the master-secret. The Client and the User and the Server can now communicate further using the MashSSL-Application-Data-XML message. Note that the mashssl-user-client-key and mashssl-server-client-key will be unique to this session.

This approach of reusing parameters allows the Client and the Server to literally establish millions of delegated authentication sessions without having to reestablish parameters. This is a huge performance benefit for major web services that have to frequently communicate on behalf of different users.

The Customer and the Service Provider may also choose to resume the session between themselves without going through the user, if the user has authorized such communication. In this case the Customer sends a MashSSL-Direct-Handshake-XML1 message to the Service Provider, as shown in FIG. 12. The Service-Provider responds with a MashSSL-Direct-Handshake-XML2 as shown in FIG. 13, and the Customer completes the handshake by responding with Mash-SSL-Direct-Handshake-XML3, as shown in FIG. 14. The main differences between the direct and the abbreviated protocols is in that as the User is not in the middle in the latter, the scrambling options and related fields are not needed.

What is claimed is:

1. A method for efficient delegated authentication to allow a delegator entity, to delegate authority to another delegatee entity, to obtain information from, or take actions at, a third entity, on its behalf; the method comprising:
   configuring a processor to perform the steps of:
   (a) the delegatee entity sending the first SSL Client-Hello handshake message, to the third entity, via the delegator entity, which the delegatee entity authenticates, and having the delegator entity approve the submission of the request en route;
   (b) the third entity replying by sending the SSL Server-Hello handshake message to the delegatee entity, via the delegator entity which the third entity authenticates, and having the delegator entity approve the submission of the response en route;
   (c) the delegatee entity replying by sending the SSL Client-Key-Exchange handshake message to the third entity, via the delegator entity;
   (d) the delegatee entity and the third entity agreeing on a master-secret not known to there delegator which can be used to authenticate each other; and
   (e) the third entity replying by sending the SSL Server-Finished handshake message including a delegation-ticket to the delegatee entity, via the delegator entity, wherein the ticket contains parameters to be used for a session with said delegator entity including a ticked lifetime for which the session can be reused and wherein said parameters can be reused to allow a plurality of delegated authentication sessions on behalf of, and via, a different delegator entity between said delegatee and said third entities without having to reestablished session parameters during said ticket lifetime time.

2. A method for allowing a one entity, the delegator, to delegate authority to another entity, the delegatee, to obtain information from, or take actions at, a third entity, on its behalf according to claim 1, wherein either the delegatee and/or the third entity do not authenticate the delegator.

3. A method for allowing a one entity, the delegator, to delegate authority to another entity, the delegatee, to obtain information from, or take actions at, a third entity, on its behalf according to claim 1, wherein additional data are sent in some or all of the messages in addition to the SSL handshake messages.

4. A method for allowing a one entity, the delegator, to delegate authority to another entity, the delegatee, to obtain information from, or take actions at, a third entity, on its behalf according to claim 3, wherein the additional data parameters in the handshake messages are used by
   (a) the delegator entity and the third entity to agree on a shared-secret not known to the delegatee entity by the end of the handshake messages.
   (b) the delegator entity and the delegatee entity to agree on a shared-secret not known to the third entity by the end of the handshake messages.

5. A method for allowing a one entity, the delegator, to delegate authority to another entity, the delegatee, to obtain information from, or take actions at, a third entity, on its behalf according to claim 4, wherein the three entities can send messages to each other encrypted with one of the shared secrets such that only the other entities who have that shared secret can decrypt the message.

6. A method for allowing a one entity, the delegator, to delegate authority to another entity, the delegatee, to obtain information from, or take actions at, a third entity, on its behalf according to claim 5, wherein the delegatee can send a message to the third entity, via the delegator, requesting data or asking for action to be performed, on behalf of the delegator.

7. A method for allowing a one entity, the delegator, to delegate authority to another entity, the delegatee, to obtain information from, or take actions at, a third entity, on its behalf according to claim 6, where the delegator can be shown the delegatee's request and explicitly authorizes some or all portions of the request before sending on to the third entity.

8. A method for allowing a one entity, the delegator, to delegate authority to another entity, the delegatee, to obtain information from, or take actions at, a third entity, on its behalf according to claim 5, wherein the third party can send data to the delegatee via the delegator.

9. A method for allowing a one entity, the delegator, to delegate authority to another entity, the delegatee, to obtain information from, or take actions at, a third entity, on its behalf according to claim 8, where the delegator can be shown the data being sent and explicitly authorizes some or all portions of the data transfer before sending on to the delegatee.

10. A method for allowing a one entity, the delegator, to delegate authority to another entity, the delegatee, to obtain information from, or take actions at, a third entity, on its behalf according to claim 8, wherein, the ticket contains various parameters which scope the privileges and lifetime associated with the ticket.

11. A method for allowing a one entity, the delegator, to delegate authority to another entity, the delegatee, to obtain information from, or take actions at, a third entity, on its behalf according to claim 1 wherein any of the SSL handshake messages being sent between the delegatee and third entities via the delegator entity, can be fully or partially scrambled and then unscrambled before processing using multiple methods of scrambling and unscrambling.

12. A method for allowing a one entity, the delegator, to delegate authority to another entity, the delegatee, to obtain information from, or take actions at, a third entity, on its behalf according to claim 1, wherein, the mutual authentication of the delegatee and the third entity happens using their SSL digital certificates.

13. A method for allowing a one entity, the delegator, to delegate authority to another entity, the delegatee, to obtain information from, or take actions at, a third entity, on its behalf according to claim 1, wherein, the delegatee entity and the third entity agree on a ticket unique to the delegator, which can be used by the delegatee to access information of take action on behalf of the delegator.

14. A method for allowing a one entity, the delegator, to delegate authority to another entity, the delegatee, to obtain information from, or take actions at, a third entity, on its behalf according to claim 1, wherein the delegatee entity and the third entity can communicate directly using the shared master-secret.

15. A method for allowing a one entity, the delegator, to delegate authority to another entity, the delegatee, to obtain information from, or take actions at, a third entity, on its behalf according to claim 14, wherein such communication can only happen if the delegator has authorized it to the delegatee and the third entity during the initial handshake.

16. A method for allowing a one entity, the delegator, to delegate authority to another entity, the delegatee, to obtain information from, or take actions at, a third entity, on its behalf according to claim 1, wherein, the delegatee entity and the third entity agree to reuse the agreed master-secret not known to the delegator entity, as a basis for re-establishment of communications on behalf of, and via, a different delegator entity.

* * * * *